Jan. 14, 1958           C. POMPA           2,819,556
HOLDER, FEEDER AND DISPENSER FOR SOLUBLE PRODUCTS
Filed Jan. 30, 1956           2 Sheets-Sheet 1
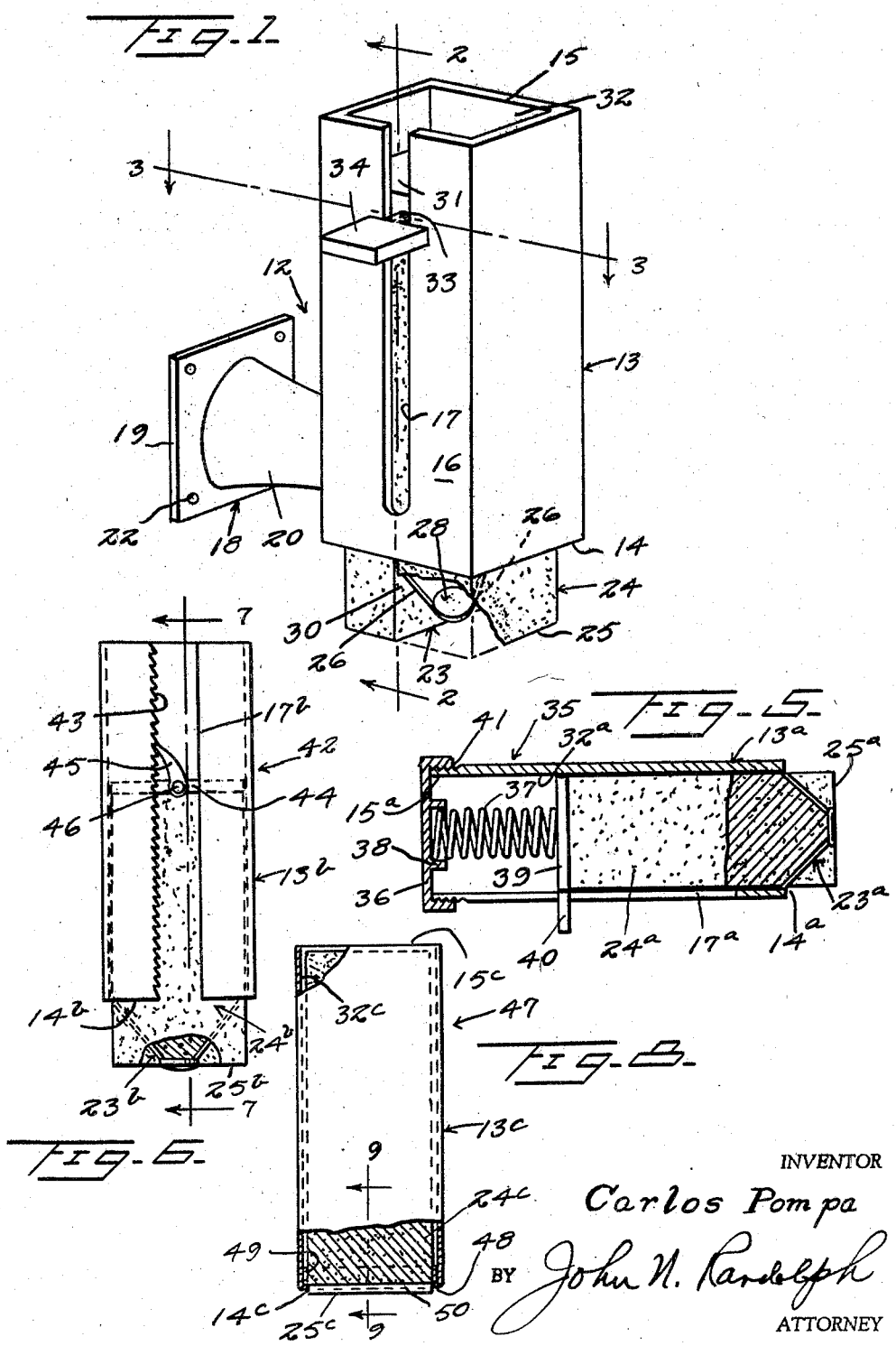
INVENTOR
Carlos Pompa
BY John N. Randolph
ATTORNEY

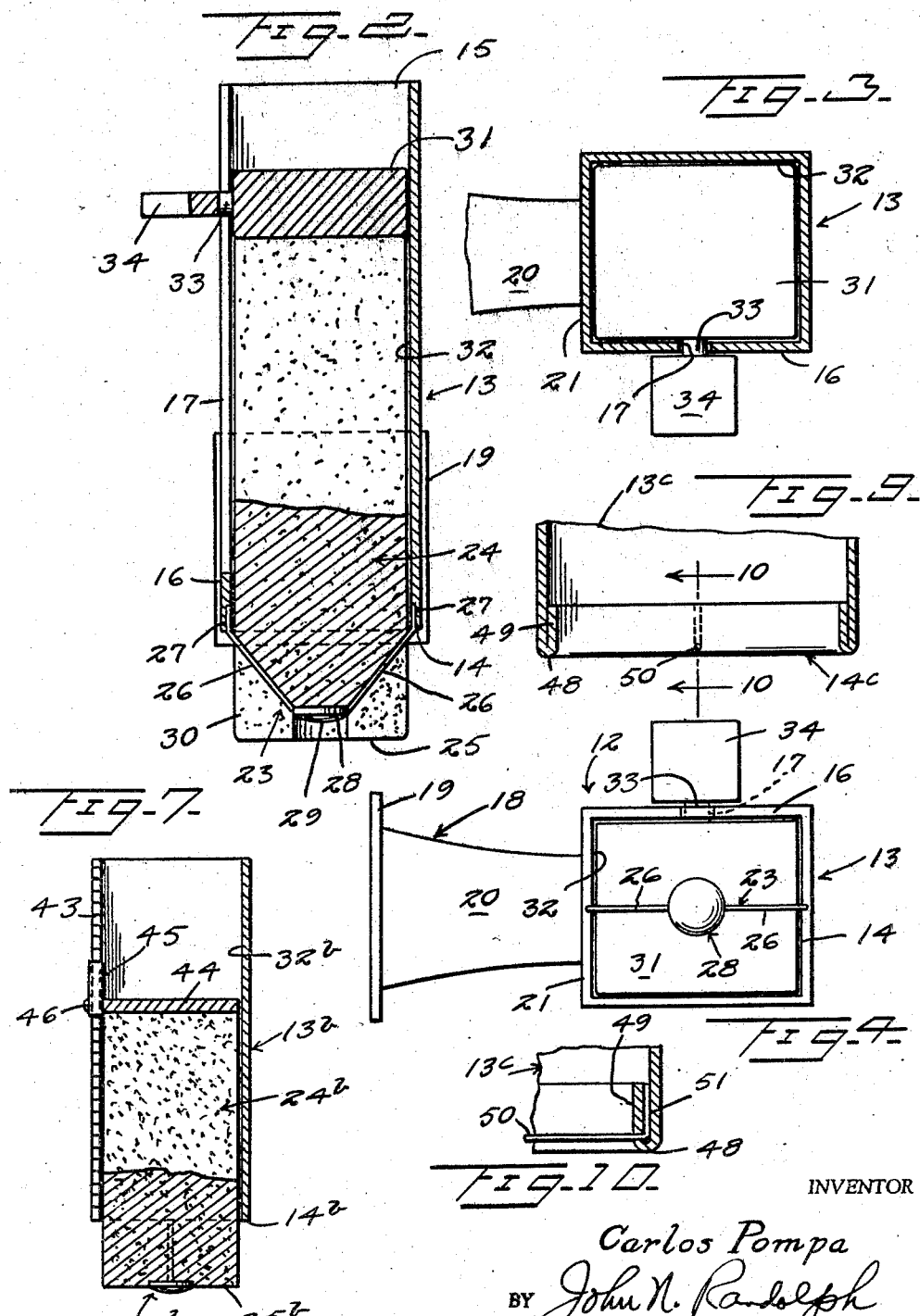

United States Patent Office 2,819,556
Patented Jan. 14, 1958

2,819,556

HOLDER, FEEDER AND DISPENSER FOR SOLUBLE PRODUCTS

Carlos Pompa, Rio de Janeiro, Brazil, assignor to Pablo D. Ladouce, Asuncion, Paraguay Application January 30, 1956, Serial No. 562,343

2 Claims. (Cl. 45—28)

This invention relates to a novel holder, feeder and dispenser for soluble products in bar or cake form and has for one of its objects to provide a device of this character which may be effectively utilized for holding, feeding and dispensing soap, certain adhesives and paints, salt and numerous other liquid soluble products which are capable of being molded into bar or cake form.

Another important object of the present invention is to provide a holder, feeder and dispenser of extremely simple construction wherein no operation is required to be performed by the user in connection with the feeding and dispensing of the soluble product other than rubbing a moistened surface across an exposed surface of the product, so that the device in addition to being well adapted for use by human beings may also be utilized as an effective dispenser for salt to cattle and other animals, since all that is required to insure the feeding and dispensing of the product is contact of the moistened tongue of the animal with the salt.

Another object of the invention is to provide a device which, due to its unique principle of operation, is of much simpler construction than conventional devices for holding, dispensing and feeding similar products, and which may involve no movable part other than a soluble bar or cake being dispensed thereby.

Numerous other objects and advantages of the invention will hereinafter become more fully apparent from the following description of the drawings, illustrating presently preferred embodiments thereof, and wherein:

Figure 1 is a perspective view of one form of the device, shown containing a soluble product to be dispensed therefrom;

Figure 2 is a longitudinal or vertical sectional view thereof, on a somewhat enlarged scale, taken substantially along a plane as indicated by the line 2—2 of Figure 1;

Figure 3 is an enlarged horizontal sectional view, taken substantially along a plane as indicated by the line 3—3 of Figure 1;

Figure 4 is a bottom plan view of the holder and dispenser of Figure 1, with the soluble product removed therefrom;

Figure 5 is a longitudinal sectional view, similar to Figure 2, of another slightly modified form of the device;

Figure 6 is a side elevational view, partly broken away, of a third form of the device;

Figure 7 is a longitudinal sectional view thereof, taken substantially along a plane as indicated by the line 7—7 of Figure 6;

Figure 8 is a side elevational view partly broken away, illustrating another form of the device;

Figure 9 is an enlarged fragmentary vertical sectional view, taken substantially along a plane as indicated by the line 9—9 of Figure 8, with the soluble product omitted, and Figure 10 is an enlarged fragmentary vertical sectional view taken substantially along a plane as indicated by the line 10—10 of Figure 9.

Referring more specifically to the drawings, and first with reference to Figures 1 to 4, the holder, feeder and dispenser in its entirety is designated generally 12 and includes an elongated hollow housing 13 having open ends 14 and 15. The housing 13 is illustrated as being of rectangular shape in cross section but as the description proceeds, it will be apparent that said hollow housing may be of any desired cross sectional shape and may likewise be of any desired length and cross sectional size. One wall 16 of the housing 13 is provided with a slot 17 which opens through the upper end 15 of said housing and extends downwardly to adjacent the lower end 14.

A bracket, designated generally 18, is illustrated in Figure 1 and includes a plate 19 and an arm 20. The arm 20 is fixed to and extends from one side of the plate 19 and has an end thereof, which is disposed remote from the plate 19, and which is suitably secured to another wall 21 of the housing 13, as seen in Figure 3. The plate 19 is provided with openings 22 for receiving fastenings, not shown, by which said plate may be secured against a supporting surface, as for example a vertical wall surface, for supporting the device 12 with the longitudinal axis of the housing 13 disposed substantially vertical. Any other suitable form of supporting means may be substituted for the bracket 18.

The device 12 also includes a supporting means, designated generally 23, which is capable of supporting a bar, cake or block 24 of a liquid soluble material in the housing 13 and with an end of the bar 24 protruding from the open lower end 14 of said housing to below said supporting means 23. The supporting means 23 is characterized by the fact that it is so constructed that it will penetrate to a limited extent the lower end of the product 24 which protrudes from the housing bottom 14, so that the bottom surface or end 25 of the product 24 will be disposed below said supporting means 23. The supporting means 23 is herein illustrated as fine strand elements 26 which have complementary ends suitably anchored in the lower portions of two or more of the walls of the housing 13, as seen at 27. Where only two such strand portions are provided, as illustrated in Figures 1, 3 and 4, said elements 26 are anchored at 27 to opposite walls of the housing 13, substantially centrally of the longitudinal axes thereof, as seen in Figure 4. Said strand portions 26 converge downwardly with respect to one another from their anchored upper ends 27. The lower portions of said strands 26 are suitably connected to or merge with a supporting element 28 which may be of any suitable size or shape and which is preferably supported by the strand portions 26 in substantially a horizontal plane beneath and in alignment with the longitudinal axis of the housing 13. Said supporting element 28 is preferably provided with a smooth convexly rounded underside 29, for a purpose which will hereinafter be described. The parts 26 and 28 will be embedded in the lower portion of the bar or cake 24, as best illustrated in Figures 1 and 2, to define a recess 30 in the cake or bar 24 above its bottom surface 25.

The device 12 may also include a block 31 forming a weight which is sized to slidably fit a bore 32 of the housing 13 and which rests on the upper end of the bar or cake 24. Said bar or cake 24 is preferably of substantially the same cross sectional size and shape as the block 31 to slidably fit in said bore 32 and to be gravity urged downwardly by the weight of said bar or cake 24 and by the weight of the block 31. The weighted block 31 has a restricted stem 33 projecting from one side wall thereof and which slidably fits the slot 17. A flat plate is suitably secured to the outer end of the stem 33 and said plate 34 is disposed on the outer side of the wall 16 and in a plane parallel to the plane of the block 31.

It will be readily apparent that the block 31 can be removed from the upper end 15 of the housing 13 by grasping and lifting upwardly on the plate-like handle 34. The bar or cake 24 is then inserted endwise into the housing bore 32 through the upper end 15 and portions of its lower end 25 will come to rest upon downwardly converging portions of the elements 26. The block 31 can then be replaced in the upper portion of the bore 32 to rest upon the upper end of the bar 24 and pressure may be exerted downwardly on the block 31 to force the bar 24 downwardly and to cause the elements 26 to penetrate the bar end 25 and until said end 25 is disposed at approximately the level of the upper surface of the abutment element 28. A moistened surface, as for example the palm of the hand, if the product 24 is soap; the tongue of an animal, if the product 24 is salt; or a moistened brush head if the product 24 is an adhesive or paint, may then be wiped across said bottom surface of the end 25 so that a part of the product 24 will be dissolved in this manner and will adhere to the surface which is moved in wiping engagement with the end 25. The rounded under surface 29 will prevent irritation or damage to the moistened surface rubbed across the end 25.

A part of the moisture from the wiping surface will penetrate and partially dissolve the portion of the cake 24 located adjacent the end 25, so that the weight of said cake and the block 31 will cause the abutment element 28 to also penetrate the cake to a depth sufficiently so that the surface 25 will be disposed completely below the element 28, as seen in Figure 2. Due to the moldable characteristic of the cake 24, the bottom surface 25 in most instances will be re-molded into a smooth substantially unbroken surface beneath the supporting means 23 so that the recess 30 formed thereby will be substantially closed below said supporting means 23.

In the aforedescribed manner the product 24 can be dispensed without the necessity of providing any means for feeding the product downwardly from the housing 13 other than the automatic feeding which results from moisture from the wiping surface penetrating the lower portion of the cake 24 and partially dissolving or softening the cake so that the cake can move downwardly relative to the supporting means 23 and as said supporting means continues to penetrate into the cake or bar as the lower end 25 is worn away by wiping contact therewith.

When the cake or bar 24 is substantially consumed in the aforedescribed manner, the block 31 is removed and another cake 24, not shown, is applied to the upper portion of the bore 32 so as to rest upon the upper end of the unconsumed portion of the cake 24. The block 31 is thereafter replaced either immediately or subsequently when space is available to accommodate it. As the upper end of the original cake becomes moistened, the weight of the new upper cake or bar will cause the abutting ends of the two bars to become molded together and the new bar will then merely constitute a continuation of the old bar in the feeding and dispensing operation.

It will be readily apparent that if the weight of the bar 24 is sufficient, the block 31 may be dispensed with. However, the handle 34 additionally functions as a gauge element to visually indicate the remaining size of the unconsumed portion of the cake or bar 24, so as to visually indicate when the device 12 should be replenished or reloaded with another bar or cake.

Additionally, the supporting means 23 merely illustrates one means which may be employed for this purpose and it will be readily apparent that various other supporting element may be utilized the cross sectional sizes of which may be varied depending upon the solubility of the product 24 and the weight thereof and of any elements supported thereon. Thus, the element 28 may be of various sizes or may be eliminated entirely, in which case the lower ends of the strand elements 26 may be otherwise suitably connected, for example as a single strand, as illustrated in Figure 8.

Figure 5 illustrates a slightly different embodiment of the holder, feeder and dispenser, designated generally 35 and which includes a housing 13a. A supporting means 23a, corresponding to the supporting means 23, extends from the open discharge end 14a and may be fixed thereto in the same manner as the supporting means 23 is anchored to the housing 13. The housing 13 has a slot 17a extending from adjacent the end 14a and opening outwardly of the other housing end 15a. The open end 15a of the housing is normally closed by a removable cap 36 which provides an abutment for one end of an expansion coiled spring 37, which is contained in the housing 13a. Said spring end preferably seats in an internally disposed annular flange or boss 38 of the cap 36, by which the spring is supported substantially axially of the housing 13a. The other end of the spring 37 bears against a follower plate 39 which in turn abuts the inner or rear end of the cake or bar 24a. Said follower 39 has an extension 40 a portion of which slidably engages the slot 17a and another portion of which projects outwardly therefrom to function as a handle and gauge, for the same purpose as the handle 34. The housing 13a is shown as being of circular shape in cross section and the cap 36 is shown connected to the end 15a by a threaded connection 41. Accordingly, the follower plate 39 will be of a proper size and shape to slidably engage the bore 32a of the housing 13a and the bar or cake 24a will be of proper cross sectional size to slidably fit said bore 32a. It will be apparent that the housing 13a could be of other cross sectional shapes and that the cap 36 could otherwise be detachably secured to the end 15a thereof. The housing 13a is supported by any suitable supporting bracket, not shown, as for example a bracket corresponding to the bracket 18, and is adapted to be disposed with its axis in substantially a horizontal plane with the product 24a being fed toward and around the support or retaining means 23a by pressure of the spring 37. After some use of the product 24a, its end 25a will be disposed beyond the means 23a, as shown in Figure 2. The device 35 is especially adapted for use in feeding and dispensing a product which can best be supported and fed horizontally.

Figures 6 and 7 illustrate another modified form of the holder, feeder and dispenser, designated generally 42 and which includes a vertically disposed rigid housing 13b having a supporting means 23b anchored to and suspended from an open lower end 14b thereof. The housing 13b is adapted to be supported with its axis disposed substantially vertical, by any suitable supporting bracket, not shown, such as a bracket corresponding to the bracket 18. The soluble product 24b in bar or cake form is of a proper cross sectional size to slidably fit the bore 32b of the housing 13b, which may be of any desired cross sectional shape and size.

In lieu of the slot 17, the housing 13b is provided with a wider slot 17b which extends from end to end thereof. An edge of the housing 13b defining one side edge of the slot 17b is provided with downwardly facing teeth 43 forming a rack. A plate 44 of a proper size to slidably fit the bore 32b, is loosely disposed therein and rests on the upper end of the cake 24b. The plate 44 is not of sufficient size to constitute a weight, like the block 31, but rather merely provides a carrier for a pawl 45, one end of which is pivotally mounted on a stem 46 which extends outwardly from a portion of the edge of the plate 44 into the slot 17b for swingably mounting the pawl 45 in said slot. Said plate 44 and the bore 32b are preferably noncircular so that the plate is nonturnably supported in the housing 13b in order that the stem 46 will be laterally spaced a desired distance from the rack 43, as illustrated in Figure 6. The pawl 45 extends upwardly from the stem 46 at an angle toward the rack 43, and the free end of the pawl is gravity urged into engagement between adjacent teeth of said rack 43 to prevent upward displacement of the plate 44 and cake or bar 24b, should too great a pressure be exerted against the bottom surface 25b in removing a part of the product 24b by the wiping and dissolving action, previously described. It will also be understood that after use the surface 25b will normally assume a position below the level of the bottommost portion of the support 23b, as is illustrated in Figure 2.

Figures 8, 9 and 10 illustrate a fourth and probably the simplest form of the holder, feeder and dispenser, designated generally 47 and which includes an elongated hollow housing 13c which may be of any cross sectional size and shape and of any length. The housing 13c is adapted to be supported with its longitudinal axis in a vertical position by any suitable supporting means, not shown, such as the bracket 18. The open lower end 14c of the housing 13c is defined by a smooth rounded edge 48, as best seen in Figures 9 and 10, formed by the lower end of the housing being turned inwardly and back upon itself to form an internal flange 49. The housing 13c is provided with a supporting or retaining means 50 illustrated as a fine wire, thread or other strand-like element having end portions which are suitably anchored to said housing 13c, for example as by having the end portions 51 extend through the flange 49 and anchored between portions of said flange and portions of walls of the housing 13c. Said supporting means 50 extends across the open bottom 14c and is preferably disposed taut so as to be positioned somewhat above the level of the rounded bottom edge 48. The soluble cake or bar 24c is inserted through the open upper end 15c of the housing 13c and is of a proper cross sectional size and shape to loosely fit the housing bore 32c and to extend loosely through the opening defined by the turned back flange 49. The bar or cake 24c can be pressed downwardly so that the supporting means 50 will be caused to penetrate the bottom part thereof and to enable the lower end or bottom surface 25c of said product to protrude below the level of said supporting means 50 and the rounded edge 48. Thereafter, the cake or bar 24c is fed in the same manner as previously described in reference to the other embodiments of the invention. The rounded edge 48 will prevent damage or irritation to a moistened surface coming in contact therewith.

In the embodiment of Figures 8 to 10, the weight of the product 24c is solely employed for feeding the product from the dispensing end 14c of the housing. Depending upon the weight of the product 14c and its degree of solubility, will depend the size, shape and construction of the supporting or retaining means 50. For example, in Figures 8 to 10 a single fine strand element which may be formed of stainless steel or nylon thread is shown as constituting the supporting means 50. For larger bars or cakes or those having a high degree of solubility, several such strands may be employed and the strands may be arranged in any desired configuration. For example, a plurality of strands can be arranged parallel to one another or crisscross to form a grill work or in any other desired manner, and the individual strand or strands may be of various cross sectional sizes and shapes to vary the resistance afforded thereby to penetration of the soluble product.

Various other modifications and changes are likewise contemplated and may obviously be resorted to, without departing from the function or scope of the invention as hereinafter defined by the appended claims.

I claim as my invention:

1. A holding, feeding and dispensing device comprising a hollow housing, a bar of soap slidably disposed in said housing, said soap bar being capable of absorbing moisture and of being softened thereby, said housing having an open discharge end through which an end of the soap bar extends, and retaining means attached to the housing and disposed adjacent said discharge end thereof against which a part of the soap bar bears for supporting said bar end in an exposed position beyond the discharge end of the housing and for limiting movement of the bar outwardly through said discharge end, said exposed outer end of the bar being adapted to be progressively dissolved and dispensed by wiping engagement of a moistened surface thereagainst and being softened by the moisture to a sufficient extent so that said retaining means will be embedded to a limited extent in said bar end, said discharge end constituting the lower end of the housing whereby the bar is gravity fed therethrough toward said retaining means and outwardly from said discharge end, said housing having a slot and including a toothed edge opening into said slot and defining a rack extending longitudinally of the housing and having downwardly facing teeth, a carrier loosely supported in said housing on the other upper end of said bar, and a pawl pivotally carried by said carrier, said pawl extending upwardly at an incline from the carrier and having a free end engaging the rack to prevent upward displacement of the bar and carrier in said housing.

2. A holding, feeding and dispensing device as in claim 1, said retaining means including strand-like elements anchored to said housing and extending from said discharge end thereof in converging relation to one another, the cross sectional expanse of the bar, as measured between said strand-like elements, being nearly equal to the spacing between anchored ends of said elements whereby said converging portions will be progressively embedded in opposite sides of the bar.

References Cited in the file of this patent

UNITED STATES PATENTS

| 382,048 | Lindner | May 1, 1888 |
| 787,167 | Beyea | Aug. 15, 1905 |
| 1,667,882 | Cooney | May 1, 1928 |
| 1,851,322 | Pears | Mar. 29, 1932 |

FOREIGN PATENTS

| 19,835 | Great Britain | 1897 |
| 776,077 | France | Oct. 22, 1934 |
| 880,863 | France | Jan. 28, 1943 |